United States Patent
Yachi

[11] Patent Number: 6,147,737
[45] Date of Patent: Nov. 14, 2000

[54] LIQUID CRYSTAL DISPLAY HAVING MICROLENS AND MANUFACTURING PROCESS THEREOF

[75] Inventor: Shigeru Yachi, Kumamoto, Japan

[73] Assignee: Kabushiki Kaisha Advanced Display, Kumamoto, Japan

[21] Appl. No.: 09/049,054

[22] Filed: Mar. 27, 1998

[30] Foreign Application Priority Data

Mar. 27, 1997 [JP] Japan .................................. 9-075540

[51] Int. Cl.⁷ ...................... G02F 1/1333; G02F 1/1335; G02F 1/1343
[52] U.S. Cl. .............................. 349/122; 349/95; 349/141
[58] Field of Search .................. 349/141, 122, 349/95, 187

[56] References Cited

U.S. PATENT DOCUMENTS

| | | | |
|---|---|---|---|
| 5,543,942 | 8/1996 | Mizuguchi et al. | 349/122 |
| 5,680,186 | 10/1997 | Watanabe et al. | 349/122 |
| 5,808,712 | 9/1998 | Hishida et al. | 349/95 |
| 5,844,644 | 12/1998 | Oh et al. | 349/141 |

FOREIGN PATENT DOCUMENTS 406138454A 5/1994 Japan .
409218400A 8/1997 Japan .

OTHER PUBLICATIONS

M. Oh–e, M. Ohta, et al. S23–1 Principles and Characteristics of Electro–Optical Behaviour with In–Plane Switching Mode pp. 577–580.
R. Kiefer et al., "P2–30 In–Plane Switching of Nematic Liquid Crystals." pp. 547–550.

*Primary Examiner*—William L. Sikes
*Assistant Examiner*—Tarifur R. Chowdhury
*Attorney, Agent, or Firm*—McDermott, Will & Emery

[57] ABSTRACT

It is intended to provide a liquid crystal display of high luminance and a manufacturing process of such a liquid crystal display which is simple and easy to manufacture, of which focal distance can be easily adjusted, and which is provided with microlens not giving rise to lowering of yield due to sticking of dust, etc. In an IPS type liquid crystal display in which a lower transparent insulating substrate 1, on which condensing lens 6 and a flattening layer 7 made of materials of different refractive indexes are formed, and an upper transparent insulating substrate 2, on which picture element electrodes 4, 5 are formed, are arranged to be opposite to each other, and a liquid crystal layer 3 is held between the lower and upper transparent insulating substrates, tapered portions 6b of the condensing lens 6 formed by etching a condensing lens layer 9 are arranged to be opposite to regions where picture element electrodes 4, 5 are formed.

12 Claims, 9 Drawing Sheets

LIQUID CRYSTAL DISPLAY HAVING MICROLENS AND MANUFACTURING PROCESS THEREOF

BACKGROUND OF THE INVENTION

1. Field of the Invention

The present invention relates to a liquid crystal display, and a manufacturing process of the liquid crystal display.

2. Prior Arts

In the conventional active matrix type liquid crystal displays, a liquid crystal display adopting the twin-steadnematics display system (hereinafter referred to as "TN display system") is heretofore well known. In the liquid crystal display adopting such a display system, a pair of transparent electrodes for driving a liquid crystal are respectively arranged on opposed surfaces of two transparent insulating substrates opposite to each other, and orientation control of the liquid crystal has been made by establishing direction of an electric field applied to the liquid crystal to be almost perpendicular to the substrate surface.

In the mentioned liquid crystal display adopting the TN display system, the liquid crystal molecule is driven in the longitudinal electric field perpendicular to the transparent insulating substrates. Accordingly, in a state that the liquid crystal molecule has been raised in oblique direction, there is a visual dependency that optical characteristics are different depending upon visual direction. As a result, a problem exists in that contrast in case of changing the visual direction changes largely, and it becomes difficult to display a half tone.

A number of attempts for correcting such a visual dependency have been heretofore proposed, and among them a display system in which direction of electric field is established to be almost in parallel to the substrate surface (hereinafter referred to as "parallel electric field") has come to draw a good deal of attention in the field of art (such a display system is hereinafter referred to as "IPS (In-Plane Switching) system"), from the viewpoint that the visual dependency may be largely corrected and that the manufacturing process in TN display system may be substantially utilized as it is. For example, an IPS type display was reported in the "In-Plane Switching of Nematic Liquid Crystals", R. Kiefer et al., JAPAN DISPLAYS 1992, HIROSHIMA, pp.547 to 550, and thereafter a number of electrode arrangements for putting the IPS system into practical use have been proposed.

Figure 9:
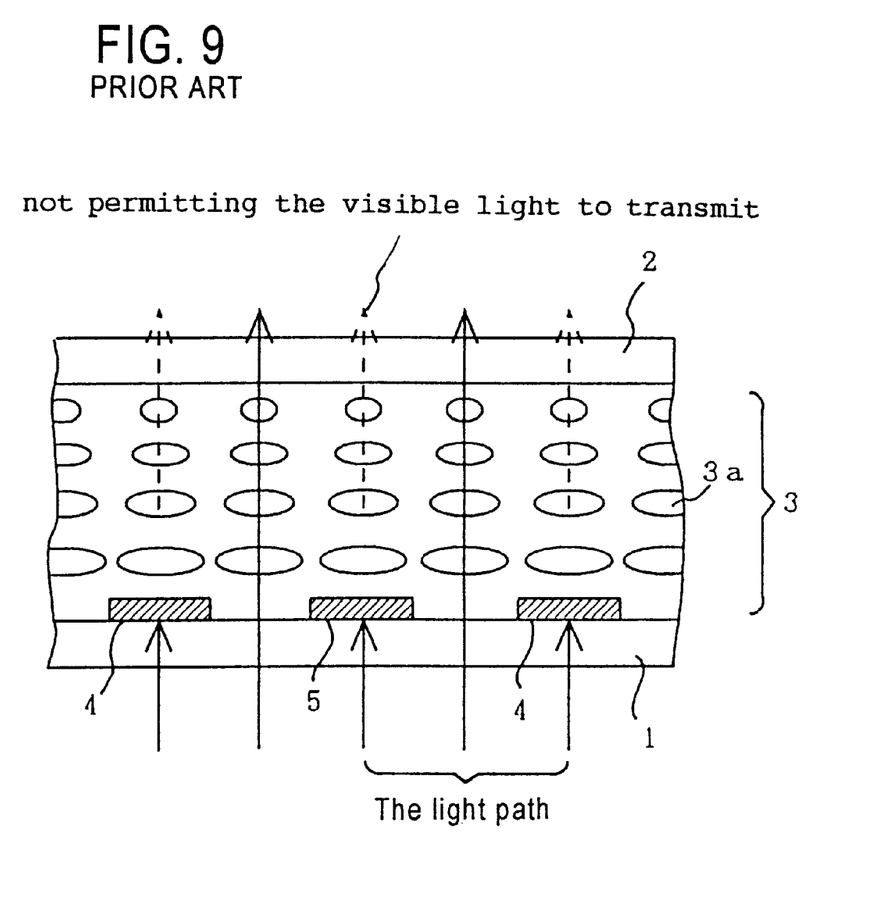
FIG. 9 is a sectional view showing a liquid crystal display device of the IPS type liquid crystal display according to the prior art.

For example, FIG. 9 is a schematic sectional view of a liquid crystal display device of an IPS type liquid crystal display shown in "Principles and Characteristics of Electrooptical Behaviour with In-Plane Switching Mode", M. Oh-e et al., ASIA DISPLAY 1995 HAMAMATSU, pp.577 to 580. In the drawing, reference numeral 1 designates a lower transparent insulating substrate on a side where an incident light comes in, numeral 2 designates an upper transparent insulating substrate, numeral 3 designates a liquid crystal layer held between the lower transparent insulating substrate 1 and the upper transparent insulating substrate 2 opposite to each other, numeral 3a is a liquid crystal molecule forming the liquid crystal layer 3, numerals 4 and 5 are respectively a first picture element electrode and a second picture element electrode both formed on the surface side of the lower transparent insulating substrate 1 opposite to the upper transparent insulating substrate 2. A predetermined voltage is applied separately to the first picture element electrode 4 and the second picture element electrode 5, and an amount of torsion of the liquid crystal molecule 3a is changed by the parallel electric field generated between the first picture element electrode 4 and the second picture element electrode 5, whereby an intensity of transmitting light in the liquid crystal layer 3 is controlled.

Further, display luminance is an important factor for evaluating a performance of the liquid crystal display, and it is a recent trend that with increasing demand for liquid crystal display of low power consumption, light quantity of back light is restrained. Therefore, improvement in light transmittance of liquid crystal display device is one of the essential technical problems to be solved.

However, in the IPS type liquid crystal display shown in FIG. 9, because a metal not permitting the visible light to transmit is usually employed as a electrode material forming the first picture element electrode 4, second picture element 5, etc., reduction in luminance is considerable. Because the light transmittance of liquid crystal display is in proportion to a percentage of opening (percentage of a light transmitting portion to the entire area of picture element), the light transmittance may be improved by increasing the percentage of opening. However, such increase in the percentage of opening is subject to restriction from the following viewpoints.

1. There is an upper limit value in the distance between the first picture element electrode 4 and the second picture element electrode 5 in view of maintaining the electric field strength to be a certain value or more and controlling smoothly the liquid crystal molecule 3a.

2. There is an lower limit value in width of the first picture element electrode 4 and the second picture element electrode 5 in view of preventing disconnection.

Taking the above restriction into consideration, it is desirable that the distance between the first picture element electrode 4 and the second picture element electrode 5 is 20 μm or less, and the width of the first picture element electrode 4 and the second picture element electrode 5 is 10 μm or more. When applying these conditions to the electrodes of a liquid crystal display of which picture element size is 300 micron in length and 100 micron in width (liquid crystal display for personal computer recently merchandized), percentage of opening is approximately 25%, which is considerably lower than the percentage of opening (50% or more) of the liquid crystal display of the conventional TN system. As a result, there arises a problem of reduction in light transmittance of the liquid crystal display and reduction in display luminance.

To improve the display luminance of IPS type liquid crystal display, the Japanese Laid-Open Patent Publication No. Hei 7-306399 proposed a method for achieving a high luminance of liquid crystal display in which a microlens array is arranged on the outside of a pair of transparent substrates between which a liquid crystal layer is held, and a light emitted from back light is refracted by the microlens and condensed on the opening portion.

In the conventional IPS type liquid crystal display of above construction proposed by the Japanese Laid-Open Patent Publication No. Hei 7-306399 in which a microlens array is arranged on the outside of a pair of transparent substrates between which a liquid crystal layer is held as a method for achieving a high luminance, there are following problems.

1. Because manufacturing process of the microlens array is complicated, in which the microlens are formed by injecting a molten acrylic resin into a mold and annealing the acrylic resin, special process and treatment are required, which results in a problem of increase in cost.

2. Because the microlens array is arranged on the outside of a pair of transparent substrates between which a liquid crystal layer is held and exposed to the air, there arises a problem of malfunction or failure due to sticking of dust, etc.

3. It is not easy to adjust a focal distance of the microlens array. Though the focal distance is adjusted according to the difference in refractive index between the microlens and the air, because the refractive index of the air is constant, for the purpose of adjusting the focal distance, it is necessary to change the refractive index of the microlens. Moreover, though the focal distance may be changed by changing the radius of curvature of the microlens, for the purpose of forming a microlens of different radius of curvature, it is necessary to prepare another mold, which brings about a further problem in the aspect of cost and work efficiency. In particular, when intending to lay out a design of optimum luminance characteristic using the focal distance as a parameter, it is not practical to employ the microlens disclosed in the Japanese Laid-Open Patent Publication No. Hei 7-306399.

SUMMARY OF THE INVENTION

The present invention was made to solve the above-discussed problems and has an object of achieving an IPS type liquid crystal display of high luminance which is simple and easy to manufacture, of which focal distance can be easily adjusted, and which is provided with microlens not giving rise to lowering of yield due to sticking of dust, etc. The invention has another object of providing a manufacturing process suitable for manufacturing such a liquid crystal display.

To accomplish the foregoing object, a liquid crystal display according to the invention comprises: a pair of transparent insulating substrates opposite to each other; a liquid crystal layer held between the pair of transparent insulating substrates; a plurality of electrodes arranged facing to the liquid crystal layer; and an optical member formed on either of the pair of transparent insulating substrates and arranged between the substrate and the plurality of electrodes.

It is preferable that the mentioned optical member has a function of refracting a light.

A further liquid crystal display according to the invention comprises: a first substrate comprised of a transparent insulating substrate, lens formed on the transparent insulating substrate, and a flattening layer formed on the lens; a second substrate comprised of another transparent insulating substrate on which a plurality of electrodes are formed; and a liquid crystal layer held between the first substrate and the second substrate; wherein said first substrate has a function of refracting a light in accordance with a difference between a refractive index of the lens and that of the flattening layer.

A yet further liquid crystal display according to the invention comprises: a first substrate comprised of a transparent insulating substrate, lens formed on the transparent insulating substrate, a flattening layer formed on the lens, and a plurality of electrodes formed on the flattening layer; a second substrate comprised of another transparent insulating substrate; and a liquid crystal layer held between the first substrate and the second substrate; wherein said first substrate has a function of refracting a light in accordance with a difference between a refractive index of the lens and that of the flattening layer.

It is preferable that focal distance of a light refracted and condensed by the lens and the flattening layer is larger than a difference between a surface formed with the lens and a surface formed with the electrodes.

It is preferable that each lens has a sectionally convex shape protruding from the transparent insulating substrate.

It is preferable that each lens having the sectionally convex shape has tapered portions.

It is preferable that each lens has sectionally triangular shapes formed of two tapered portions.

It is preferable that the lens each having sectionally triangular shapes have a refractive index smaller than that of the flattening layer, and are arranged discontinuously so as to be coincident to positions where the electrodes are formed.

It is preferable that each lens has a sectionally trapezoidal shape formed of a flat portion and two tapered portions each adjacent to two ends of the flat portions.

It is preferable that the lens each having a sectionally trapezoidal shape have a refractive index larger than that of the flattening layer, and are arranged continuously so that the tapered portions of the adjacent lens are coincident to positions where the electrodes are formed.

It is preferable that the lens are composed of silicon nitride or tantalum oxide.

It is preferable that the lens are composed of silicon oxide or magnesium fluoride.

It is preferable that the flattening layer is composed of acrylic resin or polyimide resin.

It is preferable that the electrodes are formed of first electrodes and second electrodes to each of which a voltage is applied, and form an electric field in a direction parallel to the surfaces of the transparent insulating substrates.

A manufacturing process of a liquid crystal display according to the invention comprises the steps of: forming a lens layer on a transparent insulating substrate; forming a plurality of lens by etching the lens layer; forming a flattening layer on the transparent insulating substrate formed with the lens; and forming electrodes on another transparent insulating substrate at predetermined positions.

A further manufacturing process of a liquid crystal display according to the invention comprises the steps of: forming a lens layer on a transparent insulating substrate; forming a plurality of lens by etching the lens layer; forming a flattening layer on the transparent insulating substrate formed with the lens; and forming electrodes on the flattening layer at predetermined positions.

It is preferable that a taper etching is applied to an etched end face of the lens layer.

It is preferable that a plasma etching is employed for etching the lens layer.

According to the invention, in the IPS type liquid crystal display as well as liquid crystal display of TN display system and other display mode, following technical advantages are achieved.

1. As a result of giving a function of refracting a light by stacking the lens and the flattening layer of different refractive indexes on the transparent insulating substrate, and coinciding the region where the taper portions of the lens are formed to the region where the electrodes are formed, it becomes possible to refract the light transmitted through the tapered portions of the lens and avoid the shading by the electrodes, thus luminance can be improved.

2. As a result of forming the electrodes on the flattening layer, precision in positioning the electrodes and the lens can be improved.

3. The focal distance can be easily adjusted just by changing the material of the lens and/or that of the flattening layer.

4. As the manufacturing process of the lens and the flattening layer is easy and simple, there is an adantage in the aspect of manufacturing cost. Furthermore, as the lens and the flattening layer do not contact the air once forming the liquid crystal display device, any lowering of yield due to sticking of dust, etc. does not occur.

Other objects, features and advantages of the invention will become apparent in the course of the following description with reference to the accompanying drawings.

DESCRIPTION OF THE PREFERRED EMBODIMENT

EXAMPLE 1

Figure 1:
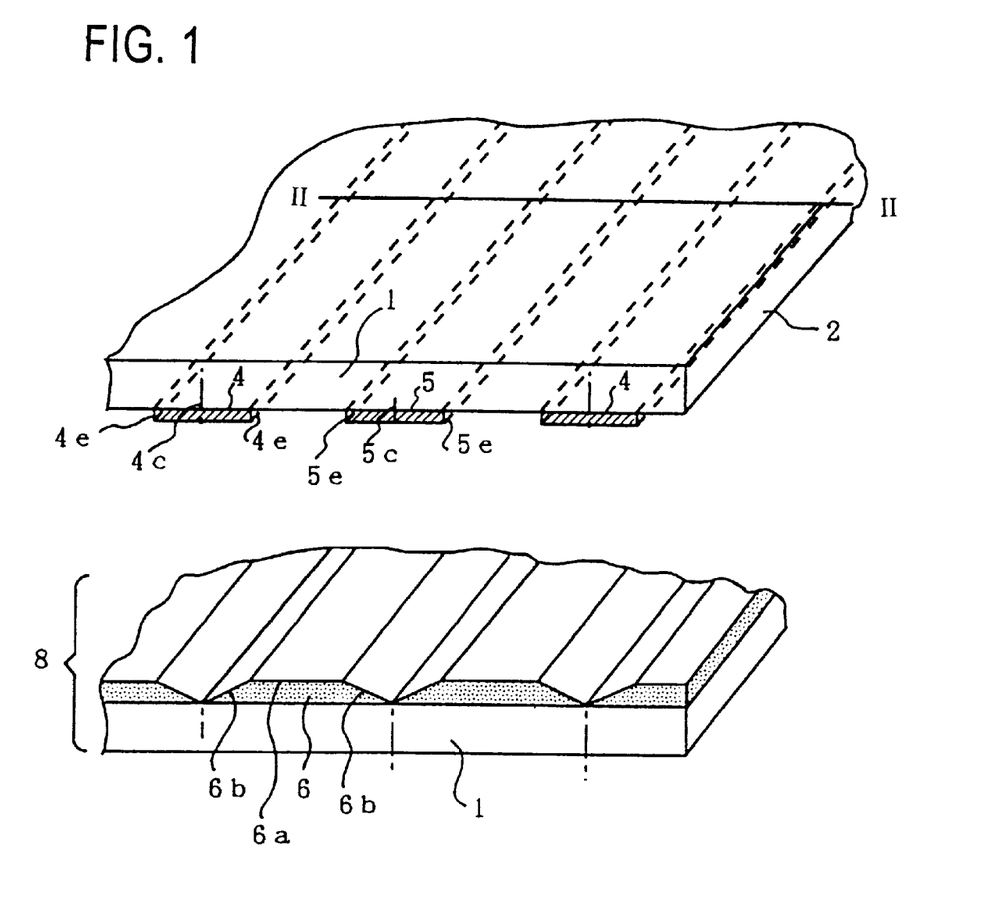
FIG. 1 is a perspective view showing a liquid crystal display device of the liquid crystal display according to example 1 of the present invention.
Figure 2:
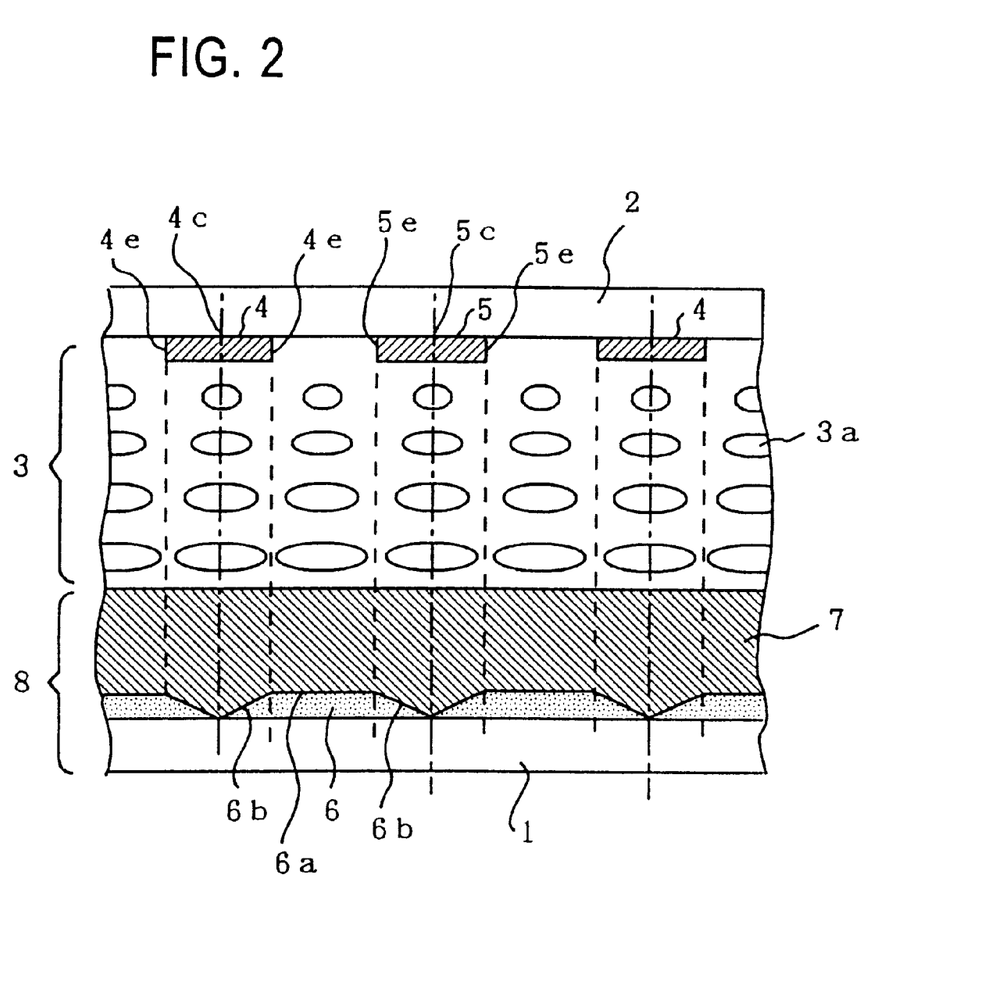
FIG. 2 is a sectional view showing a liquid crystal display device of the liquid crystal display according to example 1 of the invention.

A liquid crystal display according to an embodiment of the present invention is hereinafter described. FIG. 1 is a perspective view showing a liquid crystal display device of the liquid crystal display according to example 1 of the invention. FIG. 2 is a sectional view taken along the line II—II of FIG. 1. In the drawings, reference numeral 1 designates a lower transparent insulating substrate on a side where an incident light comes in, numeral 2 designates an upper transparent insulating substrate, numeral 3 designates a liquid crystal layer held between the lower transparent insulating substrate 1 and the upper transparent insulating substrate 2 opposite to each other, numeral 3a is a liquid crystal molecule forming the liquid crystal layer 3, numerals 4 and 5 are respectively a first picture element electrode and a second picture element electrode both formed on the upper transparent insulating substrate 2. A predetermined voltage is applied separately to the first picture element electrode 4 and the second picture element electrode 5, and an amount of torsion of the liquid crystal molecule 3a is changed by the parallel electric field generated between the first picture element electrode 4 and the second picture element electrode 5, whereby an intensity of transmitting light in the liquid crystal layer 3 is controlled. Numeral 6 is a condensing lens formed on the lower transparent insulating substrate 1, and in the sectional view, the condensing lens 6 is formed of a flat portion 6a in parallel to the lower transparent insulating substrate 1 and tapered portions 6b each having an inclination. Numeral 7 is a flattening layer which is formed on the condensing lens 6 so as to produce a different refractive index from the condensing lens 6 and stabilize the orientation of the liquid crystal layer 3. Numeral 8 is a condensing plate comprising the condensing lens 6 and the flattening layer 7 both formed on the lower transparent insulating substrate 1.

Then, a manufacturing process of the liquid crystal display of this example 1 is hereinafter described.

Figure 3A:
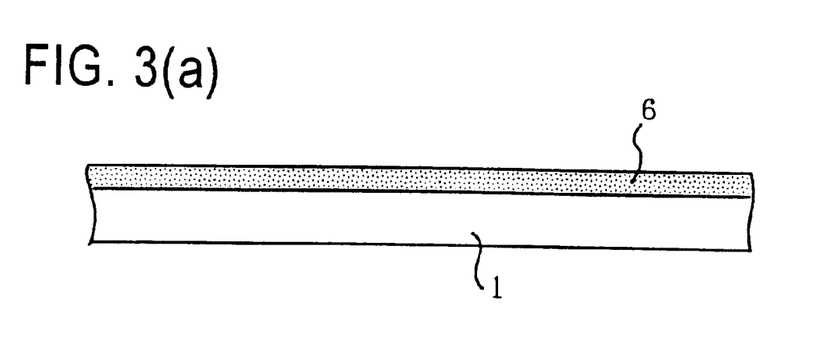
FIGS. 3(a), (b) and (c) are sectional views showing a manufacturing process of the liquid crystal display device of the liquid crystal display according to example 1 of the invention.
Figure 3B:
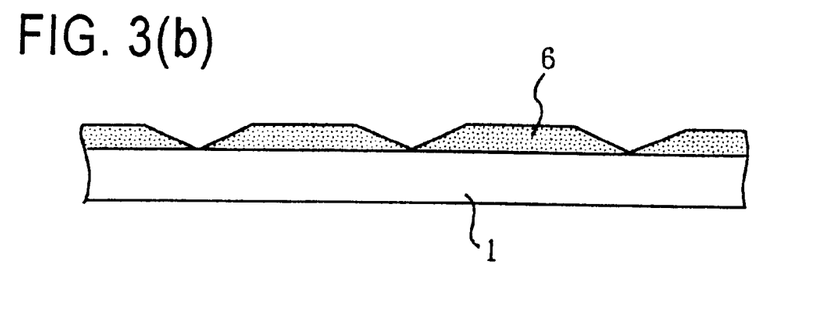
Figure 3C:
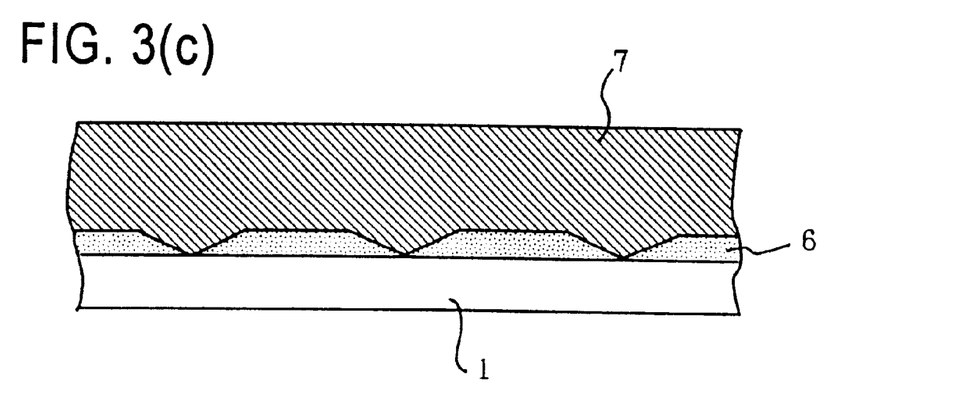

FIGS. 3(a), (b) and (c) are sectional views showing a manufacturing process of the condensing plate 8 having the condensing lens 6. First, as shown in FIG. 3(a), a condensing lens layer 6 is formed on the lower transparent insulating substrate 1 by CVD, for example. Then, a resist pattern (not illustrated) is formed thereon and an etching is applied to the condensing lens layer 6 either by dry etching or by wet etching to form the tapered portions 6b, whereby a plurality of condensing lens each having the flat portion 6a and the tapered portions 6b are formed as shown in FIG. 3(b).

As an example of the etching method of the condensing lens layer 6, a method for forming the tapered portions 6b by plasma etching is hereinafter described. The plasma etching is carried by employing any of $CF_4$, $O_2$ and $SF_6$ as an etching gas. Any special etching condition (gas pressure, etc.) is not required in the etching, and any conventional plasma etching apparatus can be employed. However, formation of the taper configuration can be advantageously carried out by forming a resist of large thickness (about 4 $\mu$m). When the etching is carried out by employing a mixed gas of $CF_4$ and $O_2$, a desired taper configuration can be obtained by adjusting gas concentration of $CF_4$ and $O_2$. The conditions of etching gas, etc. are not limited to the foregoing.

The tapered portions 6b formed in this manner are almost linearly tapered, but a gently curved taper configuration is also preferable as far as a required condensing effect is achieved.

Then, as shown in FIG. 3(c), the flattening layer 7 is formed so as to cover the lower transparent insulating substrate 1 formed with the condensing lens 6. The flattening layer 7 can be formed of acrylic resin or polyimide resin, for example, and a thickness thereof is preferably about 15 to 20 $\mu$m. The flattening layer 7 can be formed easily with high precision by spin coating, and by applying a required surface treatment to the flattening layer, the flattening layer 7 can also have a function of an orientation film, which is advantageous in the aspect of film precision and easiness in manufacture, as compared with the conventional orientation film (polyimide film) formed by roll transfer.

In this manner, the condensing plate 8 comprising the condensing lens 6 and the flattening layer 7 both formed on the lower transparent insulating substrate 1 is obtained.

On the other hand, the first picture element electrode 4 and the second picture element electrode 5 (hereinafter referred to as "picture element electrodes 4, 5") are formed on the upper transparent insulating substrate 2 by patterning in wet etching, after depositing a metal film of low resistance metal such as Ti, Cr, Al, Cu, Mo, etc. on the upper transparent insulating substrate 2 by sputtering or the like. The lower transparent insulating substrate 1 and the upper transparent insulating substrate 2 both formed in the foregoing manner are arranged to be opposite to each other, and the liquid crystal layer 3 is put between them, whereby a liquid crystal display device is formed.

In the mentioned liquid crystal display device, the condensing lens 6 on the lower transparent insulating substrate 1 are formed to be of different configuration, corresponding to the region where the picture element electrodes 4, 5 are formed on the upper transparent insulating substrate 2 and to the region where the picture element electrodes 4, 5 are not formed. That is, the flat portion 6a of the condensing lens 6 is facing to the region where the picture element electrodes 4, 5 are not formed, and thickness of the condensing lens 6 is even in this region. On the other hand, the tapered portions 6b of the condensing lens 6 are facing to the region where the picture element electrodes 4, 5 are formed, and thickness of the condensing lens 6 is not even in this region.

More specifically, in the region of the condensing lens 6 facing to the region where the picture element electrodes 4, 5 are formed, a taper cutting is applied to the condensing lens 6 so that thickness of the condensing lens 6 is gradually reduced in a direction extending from edge portions 4e, 5e of the picture element electrodes 4, 5 toward the centers 4c, 5c of the picture element electrodes 4, 5. Accordingly, the condensing lens 6 becomes trapezoidal in section being defined by the flat portion 6a in parallel to a side adjacent to the lower transparent insulating substrate 1 and the two tapered portions 6b.

As a result, in this liquid crystal display device, the plurality of condensing lens 6 formed on the lower transparent insulating substrate 1 have a sectional view showing a series of continuously arranged trapezoids, and it is to be noted that frequency in forming the tapered portions 6b of every trapezoid is coincident to that in forming the picture element electrodes 4, 5.

In addition, thickness of the flat portion 6a of each condensing lens 6 is about 4 μm.

Concerning the material forming the condensing lens 6, for the purpose of forming a convex lens with respect to an incident light 10 so that the refractive index of the condensing lens 6 is larger than that (about 1.5) of the flattening layer 7, silicon nitride (of which refractive index is 1.9) or tantalum oxide (of which refractive index is 2.0) is employed, for example.

In this example 1 of above arrangement according to the invention, following advantages are achieved.

1. By refracting the light having transmitted through the tapered portions 6b of the condensing lens 6, the light which might be shaded by the picture element electrodes 4, 5 can be transmitted to the liquid crystal layer 3, whereby coefficient of utilization of light can be increased, and luminance can be improved as much.

Figure 4:
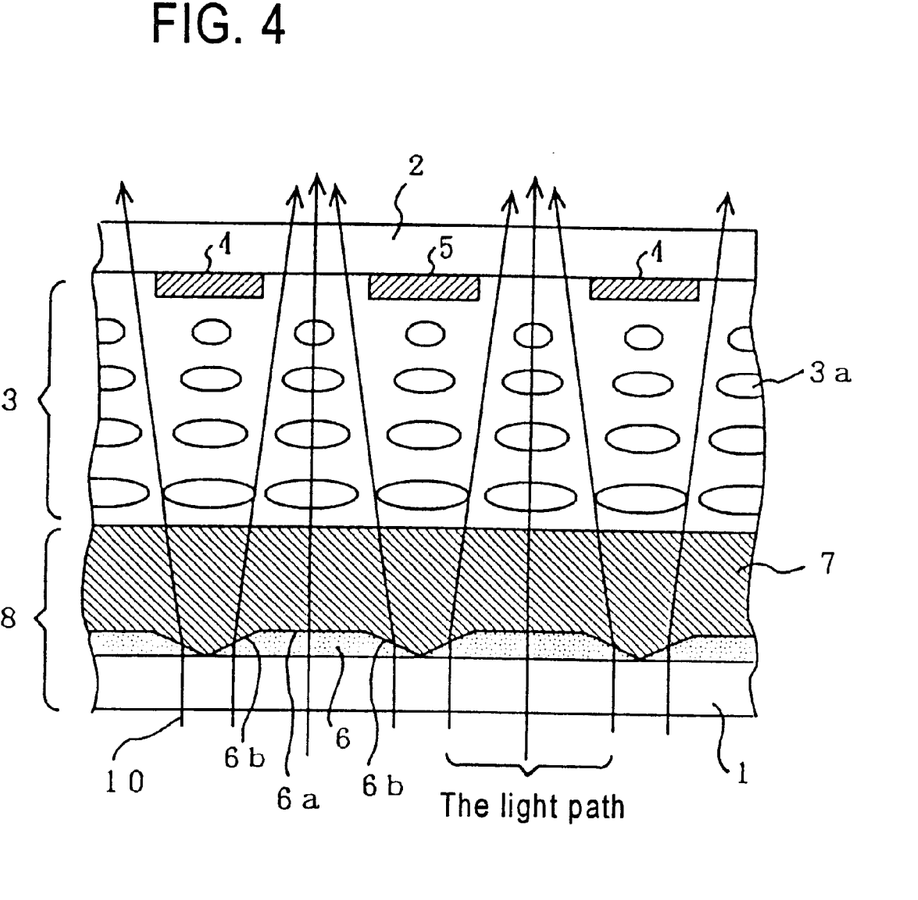
FIG. 4 is a schematic view to explain the concept of refraction of light in example 1 of the invention.

More specifically, the incident light 10 transmitting through the tapered portions 6b of the condensing lens 6 formed on the lower transparent insulating substrate 1 can be refracted a little from parallel light in accordance with a difference between the refractive index of the material forming the condensing lens 6 and that of the material forming the flattening layer 7. FIG. 4 is a schematic view to explain the concept of refraction of the incident light 10 having transmitted through the tapered portions 6 of the condensing lens 6.

It is to be noted that focal distance of the condensing lens 6 can be changed depending on the configuration of the tapered portions 6b and on the material forming the condensing lens 6 and the flattening layer 7. It is, however, preferable that to maximize the coefficient of utilization of light, a light is focused on the center of the opening between the picture element electrodes 4, 5.

2. Construction of the condensing plate 8 including the condensing lens 6 is simple, and number of manufacturing steps is few, which is advantageous in the aspect of cost. Further, for manufacturing the condensing plate 8, any method such as sputtering, spin coating, etching, etc. employed in mass production of the conventional liquid crystal display can be utilized, and any special manufacturing apparatus and step are not required.

3. Adjustment of focal distance can be easily performed. More specifically, since focal distance depends on refractive index of the condensing lens 6, refractive index of the flattening layer 7 and configuration of the tapered portions 6b, focal distance can be adjusted easily just by changing material of the condensing lens 6, material of the flattening layer 7 or thickness of the flattening layer 7.

EXAMPLE 2

Figure 5:
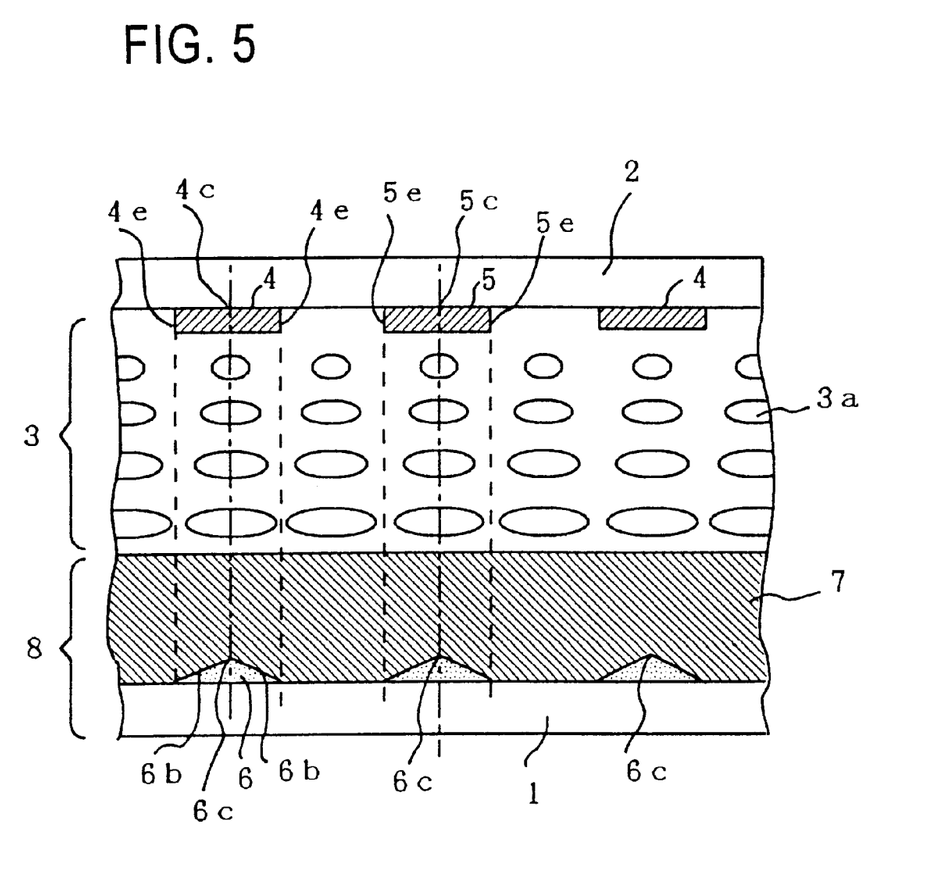
FIG. 5 is a sectional view showing a liquid crystal display device of the liquid crystal display according to example 2 of the invention.

FIG. 5 is a sectional view of a liquid crystal display device of the liquid crystal display according to example 2 of the invention.

The same reference numerals are designated to the same parts as those in FIG. 2, and a further description is omitted herein. As the manufacturing process of the condensing plate 8 having the condensing lens 6 is same as that of the foregoing example 1, a further description is omitted herein.

In the liquid crystal display device according to this example, a sectional view of each condensing lens 6 on the lower transparent insulating substrate 1 has a triangular protruding portion surrounded by the bottom side adjacent to the lower transparent insulating substrate 1 and the two tapered portions 6b. The condensing lens 6 are arranged so that tops 6c of the protruding portions are facing to centers 4c, 5c of the picture element electrodes 4, 5, and two ends of the protruding portions are facing to edges 4e, 5e of the picture element electrodes 4, 5. In other words, the condensing lens 6 are arranged so that frequency in forming the condensing lens 6 is coincident to that in forming the picture element electrodes 4, 5.

In addition, thickness of each condensing lens 6 becomes maximum at the top 6c and minimum at the two ends, and thickness of the top 6c of each condensing lens 6 is about 5 μm.

It is not always necessary that configuration of the tapered portions 6b is linear, but a gently curved taper configuration is also preferable as far as a required condensing effect is achieved.

Concerning the material forming the condensing lens 6, for the purpose of forming a concave lens with respect to an incident light 10 so that the refractive index of the condensing lens 6 is smaller than that (about 1.5) of the flattening layer 7, silicon oxide (of which refractive index is 1.4) or magnesium fluoride (of which refractive index is 1.4) is employed, for example.

Figure 6:
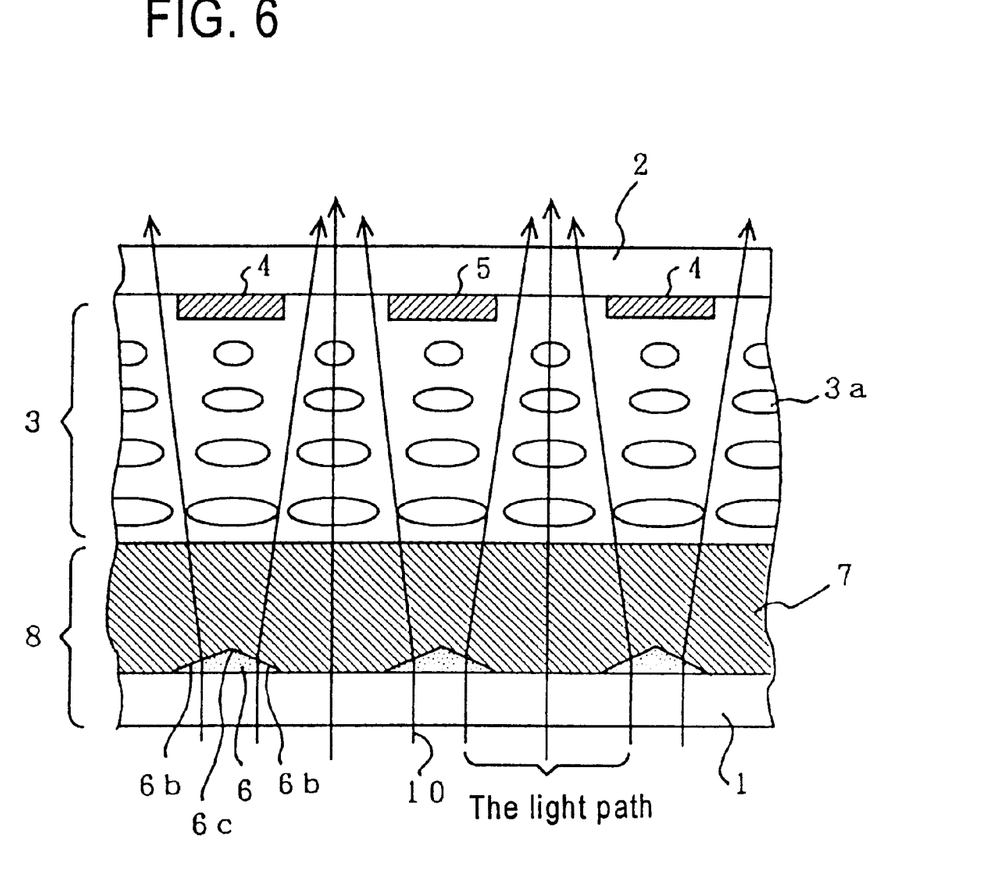
FIG. 6 is a schematic view to explain the concept of refraction of light in example 2 of the invention.

The incident light 10 transmitting through the tapered portions of the condensing lens 6 formed on the lower transparent insulating substrate 1 is refracted a little from parallel light in accordance with a difference between the refractive index of the material forming the condensing lens 6 and that of the material forming the flattening layer 7. As a result, the light which might be shaded by the picture element electrodes 4, 5 can be transmitted to the liquid crystal layer 3. FIG. 6 is a schematic view to explain the concept of refraction of the incident light 10 having transmitted through the tapered portions 6 of the condensing lens 6. In this example, the same advantages as those of the foregoing example 1 can be achieved in the aspects of improvement in luminance due to increase in coefficient of utilization of light, easiness in manufacture, and easiness in adjusting the focal distance.

EXAMPLE 3

Figure 7:
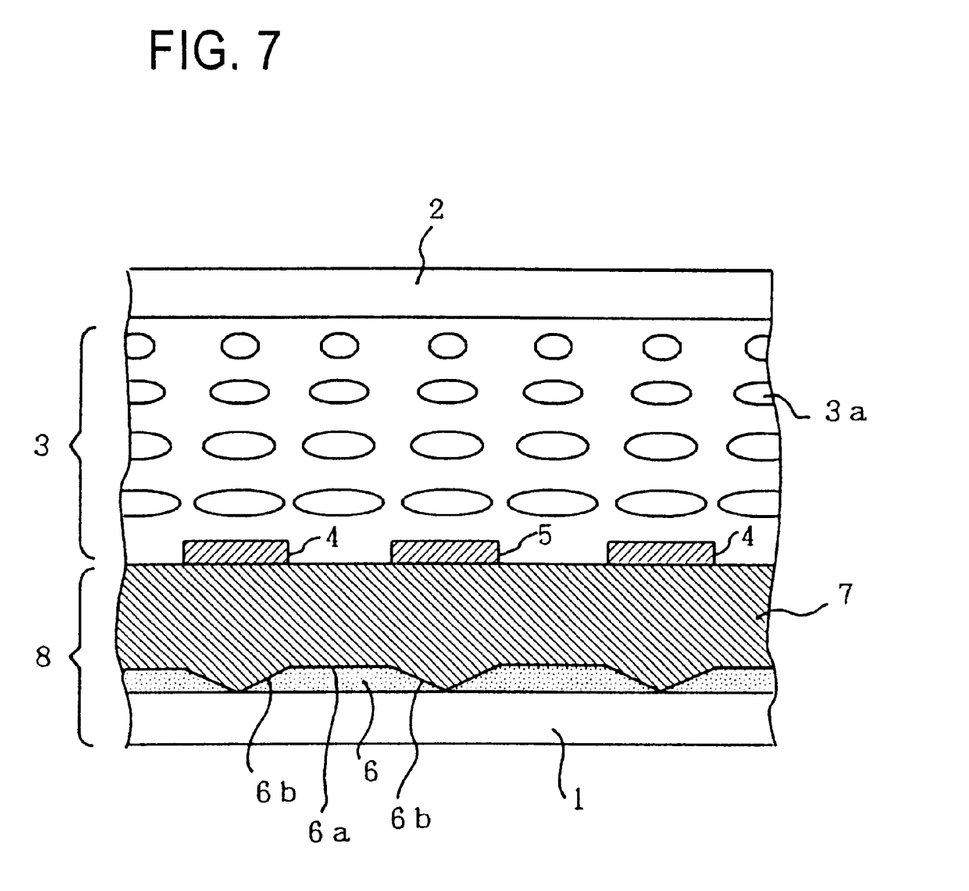
FIG. 7 is a sectional view showing a liquid crystal display device of the liquid crystal display according to example 3 of the invention.
Figure 8:
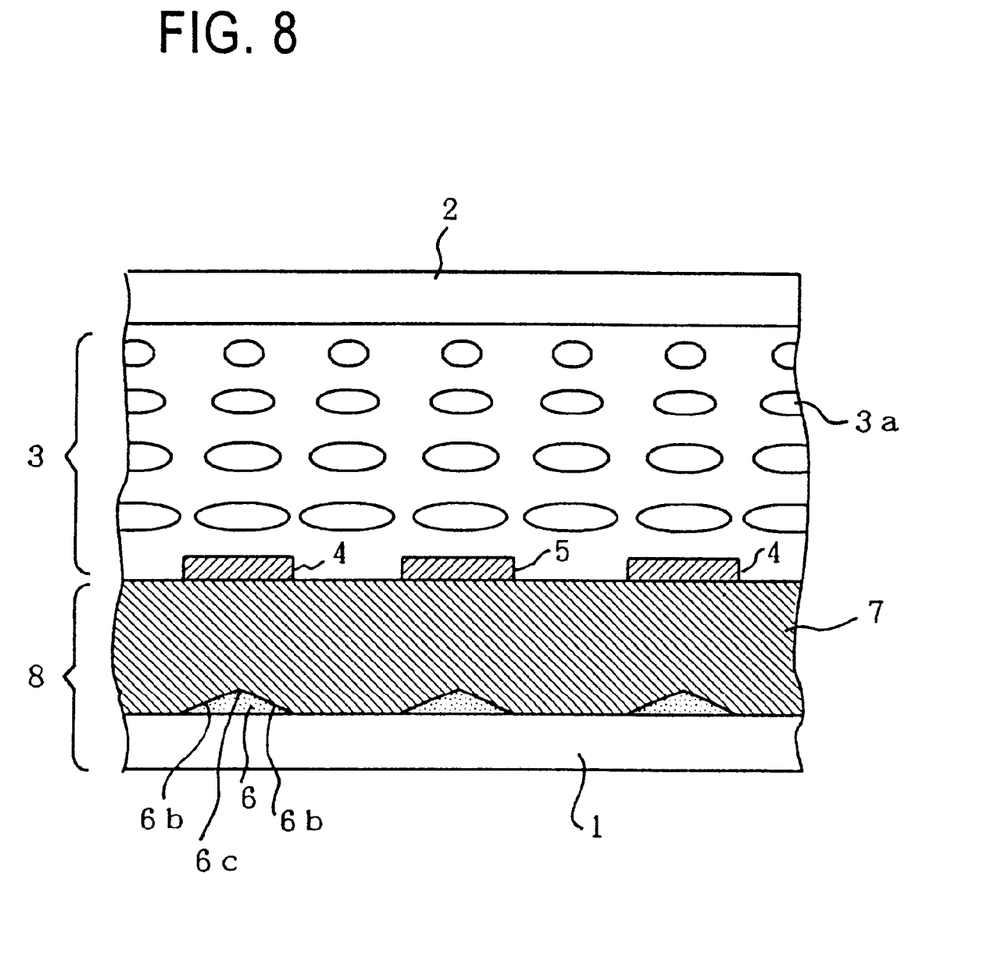
FIG. 8 is a sectional view showing a liquid crystal display device of the liquid crystal display according to example 3 of the invention.

FIGS. 7 and 8 are respectively sectional views each showing a liquid crystal display device of the liquid crystal display according to example 3 of the invention. In this example, the first picture element electrode 4 and the second picture element electrode 5 are formed on the flattening layer 7 formed on the lower transparent insulating substrate 1 through the condensing lens 6.

The same reference numerals are designated to the same parts as those in FIGS. 2 and 4, and a further description is omitted herein.

In this example, the same advantages as those of the foregoing example 1 can be achieved and, furthermore, since the picture element electrodes 4, 5 are formed on the lower transparent insulating substrate 1, precision in positioning the picture element electrodes 4, 5 and the lens 6 can be improved.

Though the condensing plate 8 is applied to the IPS type liquid crystal display in the foregoing examples 1 to 3, it is also possible to apply the condensing plate 8 to the liquid crystal display of TN display system and any other display mode.

It is further understood by those skilled in the art that the foregoing description relates to only preferred embodiments of the invention, and that various changes and modifications may be made in the invention without departing from the spirit and scope thereof.

What is claimed is:

1. A liquid crystal display comprising:
   a pair of transparent insulating substrates opposite to each other;
   a liquid crystal layer held between said pair of transparent insulating substrates;
   a plurality of electrodes arranged on one of said transparent insulating substrates facing said liquid crystal layer; and
   an optical member comprising a lens formed on another of said transparent insulating substrates and a flattening layer having an index of refraction larger than a refractive index of said lens formed on said lens,
   wherein said optical member is arranged between said another of said transparent insulating substrates and said electrodes.

2. A liquid crystal display as defined in claim 1, wherein focal distance of a light refracted and condensed by the lens and the flattening layer is larger than a difference between a surface formed with the lens and a surface formed with the electrodes.

3. A liquid crystal display as defined in claim 1, wherein each lens has a sectionally convex shape protruding from the transparent insulating substrate.

4. A liquid crystal display as defined in claim 3, wherein each lens having the sectionally convex shape has tapered portions.

5. A liquid crystal display as defined in claim 4, wherein each lens has sectionally triangular shapes formed of two tapered portions.

6. A liquid crystal display as defined in claim 4, wherein each lens has a sectionally trapezoidal shape formed of a flat portion and two tapered portions each adjacent to two ends of said flat portions.

7. A liquid crystal display as defined in claim 1, wherein the electrodes are formed of first electrodes and second electrodes to each of which a voltage is applied, and form an electric field in a direction parallel to the surfaces of the transparent insulating substrates.

8. A liquid crystal display comprising:
   a first substrate comprising a transparent insulating substrate, lens formed on said transparent insulating substrate, and a flattening layer formed on said lens;
   a second substrate comprising another transparent insulating substrate on which a plurality of electrodes are formed; and
   a liquid crystal layer disposed between said flattening layer of said first substrate on one side and said second substrate on another side;
   wherein said first substrate has a function of refracting a light in accordance with a difference between a refractive index of said lens and that of said flattening layer,
   wherein each lens has a sectionally convex shape including tapered portions protruding from the transparent insulating substrate,
   wherein each lens has sectionally triangular shapes formed of two tapered portions, and
   wherein the lens each having the sectionally triangular shapes have a refractive index smaller than that of the flattening layer, and are arranged discontinuously so as to be coincident to positions where the electrodes are formed.

9. A liquid crystal display as defined in claim 8, wherein the lens are composed of silicon nitride or tantalum oxide.

10. A liquid crystal display as defined in claim 9, wherein the flattening layer is composed of acrylic resin or polyimide resin.

11. A liquid crystal display comprising:
   a first substrate comprising a transparent insulating substrate, lens formed on said transparent insulating substrate, and a flattening layer formed on said lens;
   a second substrate comprising another transparent insulating substrate on which a plurality of electrodes are formed; and
   a liquid crystal layer disposed between said flattening layer of said first substrate on one side and said second substrate on another side;
   wherein said first substrate has a function of refracting a light in accordance with a difference between a refractive index of said lens and that of said flattening layer,
   wherein each lens has a sectionally trapezoidal shape protruding from the transparent insulating substrate and including a flat portion and two tapered portions each adjacent to two ends of said flat portion, and
   wherein the lens each having a sectionally trapezoidal shape have a refractive index larger than that of the flattening layer, and are arranged continuously so that the tapered portions of the adjacent lens are coincident to positions where the electrodes are formed.

12. A liquid crystal display as defined in claim 11, wherein the lens are composed of silicon oxide or magnesium fluoride.

* * * * *